(12) United States Patent
Cheng et al.

(10) Patent No.: US 7,671,109 B2
(45) Date of Patent: Mar. 2, 2010

(54) TINTED, ABRASION RESISTANT COATING COMPOSITIONS AND COATED ARTICLES

(75) Inventors: Shan Cheng, Pittsburgh, PA (US); Dennis L. Faler, Glenshaw, PA (US); James P. Colton, Trafford, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 843 days.

(21) Appl. No.: 11/399,147

(22) Filed: Apr. 6, 2006

(65) Prior Publication Data

US 2006/0246305 A1    Nov. 2, 2006

Related U.S. Application Data

(63) Continuation-in-part of application No. 11/337,062, filed on Jan. 20, 2006, which is a continuation-in-part of application No. 10/876,031, filed on Jun. 24, 2004.

(60) Provisional application No. 60/482,167, filed on Jun. 24, 2003.

(51) Int. Cl.
*C08K 9/10* (2006.01)
(52) U.S. Cl. ...................... 523/210; 523/205
(58) Field of Classification Search .......... 523/200–217
See application file for complete search history.

(56) References Cited

U.S. PATENT DOCUMENTS

| | | | |
|---|---|---|---|
| 3,389,061 A | 6/1968 | Bono | 204/32 |
| 4,499,143 A | 2/1985 | Panush | 428/336 |
| 4,753,827 A | 6/1988 | Yoldas et al. | 427/387 |
| 4,754,012 A | 6/1988 | Yoldas et al. | 528/10 |
| 5,035,745 A | 7/1991 | Lin et al. | 106/287.16 |
| 5,106,533 A | 4/1992 | Hendrickson et al. | 252/314 |
| 5,110,881 A | 5/1992 | McBain et al. | 525/455 |
| 5,199,979 A | 4/1993 | Lin et al. | 106/287.14 |
| 5,201,948 A | 4/1993 | Fasano et al. | 106/311 |
| 5,334,297 A | 8/1994 | Nakada et al. | 204/181.2 |
| 5,340,789 A | 8/1994 | Evans et al. | 503/227 |
| 5,538,548 A | 7/1996 | Yamazaki | 106/20 C |
| 5,538,549 A | 7/1996 | Kato et al. | 106/20 C |
| 5,716,435 A | 2/1998 | Aida et al. | 106/31.85 |
| 5,837,041 A | 11/1998 | Bean et al. | 106/31.6 |
| 5,902,711 A | 5/1999 | Smith et al. | 430/137 |
| 5,942,027 A | 8/1999 | Ikai et al. | 106/31.33 |
| 5,990,219 A | 11/1999 | Sakai et al. | 524/441 |
| 6,030,440 A | 2/2000 | Sekioka et al. | 106/31.65 |
| 6,031,024 A | 2/2000 | Uraki et al. | 523/161 |
| 6,099,627 A | 8/2000 | Saibara et al. | 106/31.33 |
| 6,106,605 A | 8/2000 | Basil et al. | 106/287.12 |
| 6,153,001 A | 11/2000 | Suzuki et al. | 106/31.65 |
| 6,329,058 B1 | 12/2001 | Arney et al. | 428/403 |
| 6,355,189 B1 | 3/2002 | Basil et al. | 252/588 |
| 6,387,997 B1 | 5/2002 | Grolemund et al. | 524/506 |
| 6,410,619 B2 | 6/2002 | Greene et al. | 524/88 |
| 6,416,818 B1 | 7/2002 | Aikens et al. | 427/383.1 |
| 6,417,249 B1 | 7/2002 | Nguyen et al. | 523/201 |
| 6,624,276 B2 | 9/2003 | Lamers et al. | 528/45 |
| 2002/0061407 A1 | 5/2002 | Colton et al. | 428/447 |
| 2002/0149002 A1 | 10/2002 | Womelsdorf et al. | 252/363.5 |
| 2002/0193514 A1 | 12/2002 | Wang et al. | 524/853 |
| 2003/0125417 A1 | 7/2003 | Vanier et al. | 523/171 |
| 2004/0156994 A1 | 8/2004 | Wiese et al. | 427/372.2 |
| 2005/0159523 A1 | 7/2005 | Bremser et al. | 524/431 |
| 2005/0182169 A1 | 8/2005 | Stubbe et al. | 524/379 |
| 2005/0212159 A1 | 9/2005 | Richards et al. | 264/40.7 |
| 2005/0212171 A1 | 9/2005 | Ferencz et al. | 264/211.21 |
| 2005/0213423 A1 | 9/2005 | Ferencz et al. | 366/76.2 |
| 2005/0287348 A1 | 12/2005 | Faler et al. | 428/315.5 |

FOREIGN PATENT DOCUMENTS

| | | |
|---|---|---|
| EP | 1006161 A1 | 6/2000 |
| EP | 1 132 448 A2 | 9/2001 |
| EP | 1 201 684 A2 | 5/2002 |
| EP | 1371694 A2 | 12/2003 |
| WO | WO 02/14391 A2 | 2/2002 |
| WO | WO 02/26894 A1 | 4/2002 |
| WO | WO 03/095532 A1 | 11/2003 |
| WO | WO 03/095571 A1 | 11/2003 |
| WO | WO 2004/000916 A2 | 12/2003 |
| WO | WO 2004/081222 A2 | 9/2004 |
| WO | WO 2006/077256 A1 | 7/2006 |
| WO | WO 2007/024461 A2 | 3/2007 |
| WO | WO 2007/024462 A2 | 3/2007 |

*Primary Examiner*—Edward J Cain
(74) *Attorney, Agent, or Firm*—Donald R. Palladino

(57) ABSTRACT

Disclosed are tinted, abrasion resistant coating compositions comprising polymer-enclosed color-imparting particles. Also disclosed are methods for making such a composition and substrates at least partially coated with a hard coat deposited from such a composition.

19 Claims, No Drawings ial Appli- 15

TINTED, ABRASION RESISTANT COATING COMPOSITIONS AND COATED ARTICLES

CROSS-REFERENCE TO RELATED APPLICATIONS

This application is a continuation-in-part of U.S. patent application Ser. No. 11/337,062, filed Jan. 20, 2006 and entitled, "Aqueous Dispersions Of Polymer-Enclosed Particles, Related Coating Compositions And Coated Substrates", which is a continuation-in-part of U.S. patent application Ser. No. 10/876,031, filed Jun. 24, 2004 entitled, "Aqueous Dispersions of Microparticles Having a Nanoparticulate Phase and Coating Compositions Containing The Same", which claims the benefits of U.S. Provisional Application Ser. No. 60/482,167 filed Jun. 24, 2003, each of which are incorporated herein by reference.

FIELD OF THE INVENTION

The present invention relates to tinted, abrasion resistant coating compositions comprising polymer-enclosed color-imparting particles. The present invention also relates to methods for making such a composition and substrates at least partially coated with a hard coat deposited from such a composition.

BACKGROUND INFORMATION

Coating compositions used to form durable, i.e., abrasion and chemically resistant coatings are often deposited from sol-gel, i.e., solution-gelation, compositions. Such coatings are often deposited on plastic substrates, including transparent plastic substrates, which are often desired for a variety of applications, such as windshields, lenses, consumer electronic devices, among other things. To minimize scratching, as well as other forms of degradation, clear "hard coats," as these coatings are often called, are often applied as protective layers to the substrate.

"Colored" or "tinted" hard coats are desired in some applications for aesthetic and other reasons. Such hard coats can be produced by imbibition of a colorant into a coated substrate by immersion of the substrate in a hot solution of the colorant or by depositing the colorant on the surface of the substrate and thermally transferring the colorant into the substrate. Depending upon the substrate material, however, such a process can result in an inconsistent color appearance and may impact the mechanical and/or chemical properties of the substrate. In addition, such a process can be complicated and can involve additional equipment, time and material.

It would be advantageous to provide tinted, abrasion resistant coating compositions suitable for produced a transparent tinted hard coat on a substrate. Moreover, it would also be desirable to provide such coating compositions that adhere directly to a plastic substrate, without the need of a primer layer, and which are stable, i.e., they do not solidify upon standing for a reasonable period of time.

SUMMARY OF THE INVENTION

In certain respects, the present invention is directed to coating compositions comprising: (a) an alkoxide of the general formula $R_xM(OR')_{z-x}$ where R is an organic radical, M is silicon, aluminum, titanium, and/or zirconium, each R' is independently an alkyl radical, z is the valence of M, and x is a number less than z and may be zero; and (b) polymer-enclosed color-imparting particles.

In another respect, the present invention is directed to methods for preparing a coating composition. These methods comprise: (a) preparing an organic dispersion of polymer-enclosed color-imparting particles; (b) preparing an at least partially hydrolyzed alkoxide of the formula $R_xM(OR')_{z-x}$, wherein R is an organic radical, M is selected from the group consisting of silicon, aluminum, titanium, zirconium and mixtures thereof, each R' is independently an alkyl radical, z is the valence of M and x is less than z and may be zero; and (c) combining the organic dispersion of color-imparting particles with the at least partially hydrolyzed alkoxide.

In another respect, the present invention is directed to an article at least partially coated with a tinted hard coat deposited from a coating composition comprising: (a) an alkoxide of the general formula $R_xM(OR')_{z-x}$ where R is an organic radical, M is silicon, aluminum, titanium, and/or zirconium, each R' is independently an alkyl radical, z is the valence of M, and x is a number less than z and may be zero; and (b) polymer-enclosed color-imparting particles.

In yet another respect, the present invention is related to a method for tinting a coating composition comprising an at least partially hydrolyzed alkoxide of the formula $R_xM(OR')_{z-x}$, wherein R is an organic radical, M is selected from the group consisting of silicon, aluminum, titanium, zirconium and mixtures thereof, each R' is independently an alkyl radical, z is the valence of M and x is less than z and may be zero, the method comprises including in the composition an organic dispersion of polymer-enclosed color-imparting particles.

DETAILED DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

As previously mentioned, certain embodiments of the present invention are directed to coating compositions that comprise an alkoxide of the general formula $R_xM(OR')_{z-x}$ where R is an organic radical, M is silicon, aluminum, titanium, and/or zirconium, each R' is independently an alkyl radical, z is the valence of M, and x is a number less than z and may be zero. Examples of suitable organic radicals include, but are not limited to, alkyl, vinyl, methoxyalkyl, phenyl, γ-glycidoxy propyl and γ-methacryloxy propyl. The alkoxide can be further mixed and/or reacted with other compounds and/or polymers known in the art. Particularly suitable are compositions comprising siloxanes formed from at least partially hydrolyzing an organoalkoxysilane, such as one within the formula above. Examples of suitable alkoxide-containing compounds and methods for making them are described in U.S. Pat. Nos. 6,355,189; 6,264,859; 6,469,119; 6,180,248; 5,916,686; 5,401,579; 4,799,963; 5,344,712; 4,731,264; 4,753,827; 4,754,012; 4,814,017; 5,115,023; 5,035,745; 5,231,156; 5,199,979; and 6,106,605, which are incorporated by reference herein.

In certain embodiments, the alkoxide comprises a combination of a glycidoxy[($C_1$-$C_3$)alkyl]tri($C_1$-$C_4$)alkoxysilane monomer and a tetra($C_1$-$C_6$)alkoxysilane monomer. Glycidoxy[($C_1$-$C_3$)alkyl]tri($C$-$C_4$)alkoxysilane monomers suitable for use in the coating compositions of the present invention include glycidoxymethyltriethoxysilane, α-glycidoxyethyltrimethoxysilane, α-glycidoxyethyltriethoxysilane, β-glycidoxyethyltrimethoxysilane, β-glycidoxyethyltriethoxysilane, α-glycidoxy-propyltrimethoxysilane, αglycidoxypropyltrimethoxysilane, β-glycidoxypropyltrimethoxysilane, β-glycidoxypropyltrimethoxysilane, γ-glycidoxypropyl-triethoxysilane, hydrolysates thereof, and/or mixtures of such silane monomers.

Suitable tetra($C_1$-$C_6$)alkoxysilanes that may be used in combination with the glycidoxy[($C_1$-$C_3$)alkyl]tri($C_1$-$C_4$) alkoxysilane in the coating compositions of the present invention include, for example, materials such as tetramethoxysilane, tetraethoxysilane, tetrapropoxysilane, tetrabutoxysilane, tetrapentyloxysilane, tetrahexyloxysilane and mixtures thereof.

In certain embodiments, the glycidoxy[($C_1$-$C_3$)alkyl]tri ($C_1$-$C_4$)alkoxysilane and tetra($C_1$-$C_6$)alkoxysilane monomers used in the coating compositions of the present invention are present in a weight ratio of glycidoxy [($C_1$-$C_3$)alkyl] tri($C_1$-$C_4$)alkoxysilane to tetra($C_1$-$C_6$)alkoxysilane of from 0.5:1 to 100:1, such as 0.75:1 to 50:1 and, in some cases, from 1:1 to 5:1.

In certain embodiments, the alkoxide is at least partially hydrolyzed before it is combined with other components of the coating composition, such as the polymer-enclosed color-imparting particles. Such a hydrolysis reaction is described in U.S. Pat. No. 6,355,189 at col. 3, lines 7 to 28, the cited portion of which being incorporated by reference herein.

In certain embodiments, water is provided in an amount necessary for the hydrolysis of the hydrolyzable alkoxide(s). For example, in certain embodiments, water is present in an amount of at least 1.5 moles of water per mole of hydrolyzable alkoxide. In certain embodiments, atmospheric moisture, if sufficient, can be adequate.

In certain embodiments, a catalyst is providing to catalyze the hydrolysis and condensation reaction. In certain embodiments, the catalyst is an acidic material and/or a material, different from the acidic material, which generates an acid upon exposure to actinic radiation. In certain embodiments, the acidic material is chosen from an organic acid, inorganic acid or mixture thereof. Non-limiting examples of such materials include acetic, formic, glutaric, maleic, nitric, hydrochloric, phosphoric, hydrofluoric, sulfuric acid or mixtures thereof.

Any material that generates an acid on exposure to actinic radiation can be used as a hydrolysis and condensation catalyst in the coating compositions of the present invention, such as a Lewis acid and/or a Bronsted acid. Non-limiting examples of acid generating compounds include onium salts and iodosyl salts, aromatic diazonium salts, metallocenium salts, o-nitrobenzaldehyde, the polyoxymethylene polymers described in U.S. Pat. No. 3,991,033, the o-nitrocarbinol esters described in U.S. Pat. No. 3,849,137, the o-nitrophenyl acetals, their polyesters and end-capped derivatives described in U.S. Pat. No. 4,086,210, sulphonate esters or aromatic alcohols containing a carbonyl group in a position alpha or beta to the sulphonate ester group, N-sulphonyloxy derivatives of an aromatic amide or imide, aromatic oxime sulphonates, quinone diazides, and resins containing benzoin groups in the chain, such as those described in U.S. Pat. No. 4,368,253. Examples of these radiation activated acid catalysts are also disclosed in U.S. Pat. No. 5,451,345.

In certain embodiments, the acid generating compound is a cationic photoinitiator, such as an onium salt. Non-limiting examples of such materials include diaryliodonium salts and triarylsulfonium salts, which are commercially available as SarCat® CD-1012 and CD-1011 from Sartomer Company. Other suitable onium salts are described in U.S. Pat. No. 5,639,802, column 8, line 59 to column 10, line 46. Examples of such onium salts include 4,4'-dimethyldiphenyliodonium tetrafluoroborate, phenyl-4-octyloxyphenyl phenyliodonium hexafluoroantimonate, dodecyldiphenyl iodonium hexafluoroantimonate, [4-[(2-tetradecanol)oxy]phenyl]phenyl iodonium hexafluoroantimonate and mixtures thereof.

The amount of catalyst used in the coating compositions of the present invention can vary widely and depend on the particular materials used. Only the amount required to catalyze and/or initiate the hydrolysis and condensation reaction is required, e.g., a catalyzing amount. In certain embodiments, the acidic material and/or acid generating material can be used in an amount from 0.01 to 5 percent by weight, based on the total weight of the composition.

As previously indicated, the coating compositions of the present invention also comprise polymer-enclosed color-imparting particles. As used herein, the term "polymer-enclosed particles" refers to particles that are at least partially enclosed by, i.e., confined within, a polymer to an extent sufficient to separate particles from each other within the resulting coating composition, such that significant agglomeration of the particles is prevented. It will be appreciated, of course, that a coating composition of the present invention that comprises such "polymer-enclosed particles" may also include particles that are not polymer-enclosed particles. As used herein, the term "color-imparting particle" refers to a particle that significantly absorbs some wavelengths of visible light, that is, wavelengths ranging from 400 to 700 nanometers, more than it absorbs other wavelengths in the visible region.

In certain embodiments, the particles that are enclosed by a polymer comprise nanoparticles. As used herein, the term "nanoparticle" refers to a particle that has a particle size of less than 1 micron. In certain embodiments, the nanoparticles used in the present invention have an average particle size of 300 nanometers or less, such as 200 nanometers or less, or, in some cases, 100 nanometers or less.

For purposes of the present invention, average particle size can be measured according to known laser scattering techniques. For example, average particle size can be determined using a Horiba Model LA 900 laser diffraction particle size instrument, which uses a helium-neon laser with a wave length of 633 nanometers to measure the size of the particles and assumes the particle has a spherical shape, i.e., the "particle size" refers to the smallest sphere that will completely enclose the particle. Average particle size can also be determined by visually examining an electron micrograph of a transmission electron microscopy ("TEM") image of a representative sample of the particles, measuring the diameter of the particles in the image, and calculating the average primary particle size of the measured particles based on magnification of the TEM image. One of ordinary skill in the art will understand how to prepare such a TEM image and determine the primary particle size based on the magnification. The primary particle size of a particle refers to the smallest diameter sphere that will completely enclose the particle. As used herein, the term "primary particle size" refers to the size of an individual particle as opposed to an agglomeration of two or more individual particles.

The shape (or morphology) of the polymer-enclosed color-imparting particles can vary. For example, generally spherical morphologies (such as solid beads, microbeads, or hollow spheres), can be used, as well as particles that are cubic, platy, or acicular (elongated or fibrous). Additionally, the particles can have an internal structure that is hollow, porous or void free, or a combination of any of the foregoing, e.g., a hollow center with porous or solid walls. For more information on suitable particle characteristics see H. Katz et al. (Ed.), Handbook of Fillers and Plastics (1987) at pages 9-10.

Depending on the desired properties and characteristics of the resultant coating composition (e.g., coating hardness, scratch resistance, stability, or color), mixtures of one or more polymer-enclosed color-imparting particles having different average particle sizes can be employed.

The polymer-enclosed color-imparting particles, such as nanoparticles, can be formed from polymeric and/or non-polymeric inorganic materials, polymeric and/or non-polymeric organic materials, composite materials, as well as mixtures of any of the foregoing. As used herein, "formed from" denotes open, e.g., "comprising," claim language. As such, it is intended that a composition or substance "formed from" a list of recited components be a composition comprising at least these recited components, and can further comprise other, non-recited components, during the composition's formation. Additionally, as used herein, the term "polymer" is meant to encompass oligomers, and includes without limitation both homopolymers and copolymers.

As used herein, the term "polymeric inorganic material" means a polymeric material having a backbone repeat unit based on an element or elements other than carbon. Moreover, as used herein, the term "polymeric organic materials" means synthetic polymeric materials, semi-synthetic polymeric materials and natural polymeric materials, all of which have a backbone repeat unit based on carbon.

The term "organic material," as used herein, means carbon containing compounds wherein the carbon is typically bonded to itself and to hydrogen, and often to other elements as well, and excludes binary compounds such as the carbon oxides, the carbides, carbon disulfide, etc.; such ternary compounds as the metallic cyanides, metallic carbonyls, phosgene, carbonyl sulfide, etc.; and carbon-containing ionic compounds such as metallic carbonates, for example calcium carbonate and sodium carbonate.

As used herein, the term "inorganic material" means any material that is not an organic material.

As used herein, the term "composite material" means a combination of two or more differing materials. The particles formed from composite materials generally have a hardness at their surface that is different from the hardness of the internal portions of the particle beneath its surface. More specifically, the surface of the particle can be modified in any manner well known in the art, including, but not limited to, chemically or physically changing its surface characteristics using techniques known in the art.

For example, a particle can be formed from a primary material that is coated, clad or encapsulated with one or more secondary materials to form a composite particle that has a softer surface. In certain embodiments, particles formed from composite materials can be formed from a primary material that is coated, clad or encapsulated with a different form of the primary material. For more information on particles useful in the present invention, see G. Wypych, Handbook of Fillers, 2nd Ed. (1999) at pages 15-202.

As aforementioned, the particles useful in the present invention can include any inorganic materials known in the art. Suitable particles can be formed from ceramic materials, metallic materials, and mixtures of any of the foregoing. Non-limiting examples of such ceramic materials can comprise metal oxides, mixed metal oxides, metal nitrides, metal carbides, metal sulfides, metal silicates, metal borides, metal carbonates, and mixtures of any of the foregoing. A specific, non-limiting example of a metal nitride is boron nitride; a specific, non-limiting example of a metal oxide is zinc oxide; non-limiting examples of suitable mixed metal oxides are aluminum silicates and magnesium silicates; non-limiting examples of suitable metal sulfides are molybdenum disulfide, tantalum disulfide, tungsten disulfide, and zinc sulfide; non-limiting examples of metal silicates are aluminum silicates and magnesium silicates, such as vermiculite.

In certain embodiments of the present invention, the particles comprise inorganic materials selected from aluminum, barium, bismuth, boron, cadmium, calcium, cerium, cobalt, copper, iron, lanthanum, magnesium, manganese, molybdenum, nitrogen, oxygen, phosphorus, selenium, silicon, silver, sulfur, tin, titanium, tungsten, vanadium, yttrium, zinc, and zirconium, including oxides thereof, nitrides thereof, phosphides thereof, phosphates thereof, selenides thereof, sulfides thereof, sulfates thereof, and mixtures thereof. Suitable non-limiting examples of the foregoing inorganic particles are alumina, silica, titania, ceria, zirconia, bismuth oxide, magnesium oxide, iron oxide, aluminum silicate, boron carbide, nitrogen doped titania, and cadmium selenide.

The particles can comprise, for example, a core of essentially a single inorganic oxide, such as silica in colloidal, fumed, or amorphous form, alumina or colloidal alumina, titanium dioxide, iron oxide, cesium oxide, yttrium oxide, colloidal yttria, zirconia, e.g., colloidal or amorphous zirconia, and mixtures of any of the foregoing; or an inorganic oxide of one type upon which is deposited an organic oxide of another type.

Non-polymeric, inorganic materials useful in forming the particles used in the present invention can comprise inorganic materials selected from graphite, metals, oxides, carbides, nitrides, borides, sulfides, silicates, carbonates, sulfates, and hydroxides. A non-limiting example of a useful inorganic oxide is zinc oxide. Non-limiting examples of suitable inorganic sulfides include molybdenum disulfide, tantalum disulfide, tungsten disulfide, and zinc sulfide. Non-limiting examples of useful inorganic silicates include aluminum silicates and magnesium silicates, such as vermiculite. Non-limiting examples of suitable metals include molybdenum, platinum, palladium, nickel, aluminum, copper, gold, iron, silver, alloys, and mixtures of any of the foregoing.

In certain embodiments, the particles are selected from fumed silica, amorphous silica, colloidal silica, alumina, colloidal alumina, titanium dioxide, iron oxide, cesium oxide, yttrium oxide, colloidal yttria, zirconia, colloidal zirconia, and mixtures of any of the foregoing. In certain embodiments, the particles comprise colloidal silica. As disclosed above, these materials can be surface treated or untreated. Other useful particles include surface-modified silicas, such as are described in U.S. Pat. No. 5,853,809 at column 6, line 51 to column 8, line 43, incorporated herein by reference.

As another alternative, a particle can be formed from a primary material that is coated, clad or encapsulated with one or more secondary materials to form a composite material that has a harder surface. Alternatively, a particle can be formed from a primary material that is coated, clad or encapsulated with a differing form of the primary material to form a composite material that has a harder surface.

In one example, and without limiting the present invention, an inorganic particle formed from an inorganic material, such as silicon carbide or aluminum nitride, can be provided with a silica, carbonate or nanoclay coating to form a useful composite particle. In another non-limiting example, a silane coupling agent with alkyl side chains can interact with the surface of an inorganic particle formed from an inorganic oxide to provide a useful composite particle having a "softer" surface. Other examples include cladding, encapsulating or coating particles formed from non-polymeric or polymeric materials with differing non-polymeric or polymeric materials. A specific non-limiting example of such composite particles is DUALITE™, which is a synthetic polymeric particle coated with calcium carbonate that is commercially available from Pierce and Stevens Corporation of Buffalo, N.Y.

In certain embodiments, the particles used in the present invention have a lamellar structure. Particles having a lamellar structure are composed of sheets or plates of atoms in hexagonal array, with strong bonding within the sheet and weak van der Waals bonding between sheets, providing low shear strength between sheets. A non-limiting example of a lamellar structure is a hexagonal crystal structure. Inorganic solid particles having a lamellar fullerene (i.e., buckyball) structure are also useful in the present invention.

Non-limiting examples of suitable materials having a lamellar structure include boron nitride, graphite, metal dichalcogenides, mica, talc, gypsum, kaolinite, calcite, cadmium iodide, silver sulfide and mixtures thereof. Suitable metal dichalcogenides include molybdenum disulfide, molybdenum diselenide, tantalum disulfide, tantalum diselenide, tungsten disulfide, tungsten diselenide and mixtures thereof.

The particles can be formed from non-polymeric, organic materials. Non-limiting examples of non-polymeric, organic materials useful in the present invention include, but are not limited to, stearates (such as zinc stearate and aluminum stearate), diamond, carbon black and stearamide.

The particles used in the present invention can be formed from inorganic polymeric materials. Non-limiting examples of useful inorganic polymeric materials include polyphosphazenes, polysilanes, polysiloxanes, polygermanes, polymeric sulfur, polymeric selenium, silicones and mixtures of any of the foregoing. A specific, non-limiting example of a particle formed from an inorganic polymeric material suitable for use in the present invention is Tospearl, which is a particle formed from cross-linked siloxanes and is commercially available from Toshiba Silicones Company, Ltd. of Japan.

The particles can be formed from synthetic, organic polymeric materials. Non-limiting examples of suitable organic polymeric materials include, but are not limited to, thermoset materials and thermoplastic materials. Non-limiting examples of suitable thermoplastic materials include thermoplastic polyesters, such as polyethylene terephthalate, polybutylene terephthalate and polyethylene naphthalate, polycarbonates, polyolefins, such as polyethylene, polypropylene and polyisobutene, acrylic polymers, such as copolymers of styrene and an acrylic acid monomer and polymers containing methacrylate, polyamides, thermoplastic polyurethanes, vinyl polymers, and mixtures of any of the foregoing.

Non-limiting examples of suitable thermoset materials include thermoset polyesters, vinyl esters, epoxy materials, phenolics, aminoplasts, thermoset polyurethanes and mixtures of any of the foregoing. A specific, non-limiting example of a synthetic polymeric particle formed from an epoxy material is an epoxy microgel particle.

The particles can also be hollow particles formed from materials selected from polymeric and non-polymeric inorganic materials, polymeric and non-polymeric organic materials, composite materials and mixtures of any of the foregoing. Non-limiting examples of suitable materials from which the hollow particles can be formed are described above.

In certain embodiments, the particles used in the present invention comprise an organic pigment, for example, azo compounds (monoazo, di-azo, β-Naphthol, Naphthol AS salt type azo pigment lakes, benzimidazolone, di-azo condensation, isoindolinone, isoindoline), and polycyclic (phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone) pigments, and mixtures thereof. In certain embodiments, the organic material is selected from perylenes, quinacridones, phthalocyanines, isoindolines, dioxazines (that is, triphenedioxazines), 1,4-diketopyrrolopyrroles, anthrapyrimidines, anthanthrones, flavanthrones, indanthrones, perinones, pyranthrones, thioindigos, 4,4'-diamino-1,1'-dianthraquinonyl, as well as substituted edrivatives thereof, and mixtures thereof.

Perylene pigments used in the practice of the present invention may be unsubstituted or substituted. Substituted perylenes may be substituted at imide nitrogen atoms for example, and substituents may include an alkyl group of 1 to 10 carbon atoms, an alkoxy group of 1 to 10 carbon atoms and a halogen (such as chlorine) or combinations thereof. Substituted perylenes may contain more than one of any one substituent. The diimides and dianhydrides of perylene-3,4,9,10-tetracarboxylic acid are often used. Crude perylenes can be prepared by methods known in the art.

Phthalocyanine pigments, especially metal phthalocyanines may be used. Although copper phthalocyanines are more readily available, other metal-containing phthalocyanine pigments, such as those based on zinc, cobalt, iron, nickel, and other such metals, may also be used. Metal-free phthalocyanines are also suitable. Phthalocyanine pigments may be unsubstituted or partially substituted, for example, with one or more alkyl (having 1 to 10 carbon atoms), alkoxy (having 1 to 10 carbon atoms), halogens such as chlorine, or other substituents typical of phthalocyanine pigments. Phthalocyanines may be prepared by any of several methods known in the art. They are typically prepared by a reaction of phthalic anhydride, phthalonitrile, or derivatives thereof, with a metal donor, a nitrogen donor (such as urea or the phthalonitrile itself), and an optional catalyst, often in an organic solvent.

Quinacridone pigments, as used herein, include unsubstituted or substituted quinacridones (for example, with one or more alkyl, alkoxy, halogens such as chlorine, or other substituents typical of quinacridone pigments), and are suitable for use in the present invention. The quinacridone pigments may be prepared by any of several methods known in the art, such as by thermally ring-closing various 2,5-diamilinoterephthalic acid precursors in the presence of polyphosphoric acid.

Isoindoline pigments, which can optionally be substituted symmetrically or unsymmetrically, are also suitable for the practice of the present invention can be prepared by methods known in the art. A suitable isoindoline pigment, Pigment Yellow 139, is a symmetrical adduct of iminoisoindoline and barbituric acid precursors. Dioxazine pigments (that is, triphenedioxazines) are also suitable organic pigments and can be prepared by methods known in the art.

Mixtures of any of the previously described inorganic particles and/or organic particles can also be used.

If desired, the particles described above can be formed into nanoparticles. In certain embodiments, the nanoparticles are formed in situ during formation of an aqueous dispersion of polymer-enclosed particles, as described in more detail below. In other embodiments, however, the nanoparticles are formed prior to their incorporation into such an aqueous dispersion. In these embodiments, the nanoparticles can be formed by any of a number of various methods known in the art. For example, the nanoparticles can be prepared by pulverizing and classifying the dry particulate material. For example, bulk pigments such as any of the inorganic or organic pigments discussed above, can be milled with milling media having a particle size of less than 0.5 millimeters (mm), or less than 0.3 mm, or less than 0.1 mm. The pigment particles typically are milled to nanoparticle sizes in a high energy mill in one or more solvents (either water, organic solvent, or a mixture of the two), optionally in the presence of a polymeric grind vehicle. If necessary, a dispersant can be included, for example, (if in organic solvent) SOLSPERSE® 32000 or 32500 available from Lubrizol Corporation, or (if in water) SOLSPERSE® 27000, also available from Lubrizol Corporation. Other suitable methods for producing the nanoparticles include crystallization, precipitation, gas phase condensation, and chemical attrition (i.e., partial dissolution).

In certain embodiments, the coating compositions of the present invention comprise an organic dispersion of polymer-enclosed color-imparting particles. As used herein, the term "dispersion" refers to a two-phase system in which one phase includes finely divided particles distributed throughout a second phase, which is a continuous organic phase.

In certain embodiments, the organic dispersion of polymer-enclosed color-imparting particles is formed from the conversion of an aqueous dispersion of polymer-enclosed color-imparting particles. These aqueous dispersions often are oil-in-water emulsions, wherein an aqueous medium provides the continuous phase of the dispersion in which the polymer-enclosed particles are suspended as the organic phase. As used herein, the term "aqueous", "aqueous phase", "aqueous medium," and the like, refers to a medium that either consists exclusively of water or comprises predominantly water in combination with another material, such as, for example, an inert organic solvent. In certain embodiments, the amount of organic solvent present in the aqueous dispersions is less than 20 weight percent, such as less than 10 weight percent, or, in some cases, less than 5 weight percent, or, in yet other cases, less than 2 weight percent, with the weight percents being based on the total weight of the dispersion.

In certain embodiments, therefore, an aqueous dispersion of polymer-enclosed color-imparting particles is converted into an organic dispersion of polymer-enclosed color-imparting particles prior to combination with the at least partially hydrolyzed alkoxide described above. This conversion can be accomplished by, for example, diluting the aqueous dispersion of polymer-enclosed color-imparting particles with an organic solvent, such as a polar protic organic solvent, wherein the solvent is added in an amount sufficient to produce a dispersion wherein the continuous phase comprises predominantly organic solvent, i.e., the amount of water present in the aqueous dispersions is less than 20 weight percent, such as less than 10 weight percent, or, in some cases, less than 5 weight percent, or, in yet other cases, less than 2 weight. percent, with the weight percents being based on the total weight of the dispersion. If desired, the amount of water present in the dispersion can be further reduced via a distillation process.

Polar protic solvents are those solvents wherein a hydrogen atom is attached to an electronegative atom, such as oxygen. In other words, polar protic organic solvents are compounds that can be represented by the general formula ROH, wherein R is an organic radical. The polarity of the polar protic solvents stems from the bond dipole of the O—H bond. Examples of polar protic organic solvents, which are suitable for use in the present invention, are methanol, ethanol, isopropanol, butanol, and acetic acid.

The Examples herein illustrate a suitable method for converting an aqueous dispersion of polymer-enclosed color-imparting particles to an organic dispersion of such particles, which is suitable for use in the coating compositions of the present invention.

The polymer-enclosed color-imparting particles used in the present invention may comprise, for example, a polymer selected from acrylic polymers, polyurethane polymers, polyester polymers, polyether polymers, silicon-based polymers, co-polymers thereof, and mixtures thereof. Such polymers can be produced by any suitable method known to those skilled in the art to which the present invention pertains. Suitable polymers are disclosed in U.S. patent application Ser. No. 10/876,031 at [0061] to [0076], United States Patent Application Publication No. 2005/0287348 A1 at [0042] to [0044], and U.S. patent application Ser. No. 11/337,062 at [0054] to [0079], the cited portions of which being incorporated by reference herein.

The previously-described aqueous dispersions of polymer-enclosed color-imparting particles can be prepared by any of a variety of methods. For example, in certain embodiments, the aqueous dispersion is prepared by a method comprising (A) providing a mixture, in an aqueous medium, of (i) color-imparting particles, (ii) one or more polymerizable, ethylenically unsaturated monomers; and/or (iii) a mixture of one or more polymerizable unsaturated monomers with one or more polymers; and/or (iv) one or more polymers, and then subjecting the admixture to high stress shear conditions in the presence of an aqueous medium to particularize the admixture into polymer-enclosed color-imparting particles. Such methods are described in detail in U.S. patent application Ser. No. 10/876,031 at [0054] to [0090], the cited portion of which being incorporated by reference herein.

In certain embodiments, however, the aqueous dispersions are made by a method comprising (1) providing a mixture, in an aqueous medium, of (i) color-imparting imparting particles, (ii) a polymerizable ethylenically unsaturated monomer, and (iii) a water-dispersible polymerizable dispersant, and (2) polymerizing the ethylenically unsaturated monomer and polymerizable dispersant to form polymer-enclosed color-imparting particles comprising a water-dispersible polymer. In these embodiments, the polymerizable dispersant may comprise any polymerizable material that is water-dispersible and which, upon polymerization with the ethylenically unsaturated monomer, produces polymer-enclosed color-imparting particles comprising a water-dispersible polymer. In certain embodiments, the polymerizable dispersant comprises a polyether polyurethane that is stable when combined with the at least partially hydrolyzed alkoxide described herein.

In these embodiments, the water-dispersible polymerizable dispersant is capable of dispersing itself and other materials, including the ethylenically unsaturated monomers, in the aqueous medium without the need for surfactants and/or high shear conditions. As a result, the foregoing method for making an aqueous dispersion of polymer-enclosed color-imparting particles is particularly suitable in situations where use of high stress shear conditions, as described in U.S. patent application Ser. No. 10/876,031, is not desired or feasible. Therefore, in certain embodiments, the aqueous dispersion of polymer-enclosed color-imparting particles is prepared by a method that does not include the step of subjecting the mixture of color-imparting particles, polymerizable ethylenically unsaturated monomer, and water-dispersible polymerizable dispersant to high stress shear conditions.

In certain embodiments, the color-imparting particles, after being mixed with the ethylenically unsaturated monomer and the water-dispersible polymerizable dispersant in the aqueous medium, are formed into color-imparting nanoparticles (i.e., the nanoparticles are formed in situ). In certain embodiments, the color-imparting nanoparticles are formed by subjecting the aqueous medium to pulverizing conditions. For example, the particles can be milled with milling media having a particle size of less than 0.5 millimeters, or less than 0.3 millimeters, or, in some cases, less than 0.1 millimeters. In these embodiments, the color-imparting particles can be milled to nanoparticle size in a high energy mill in the presence of the aqueous medium, the polymerizable ethylenically unsaturated monomer, and the water-dispersible polymerizable dispersant. If desired, another dispersant can be used, such as SOLSPERSE 27000, available from Avecia, Inc.

As indicated, the foregoing methods for making aqueous dispersions of polymer-enclosed color-imparting particles include the step of polymerizing the ethylenically unsaturated monomer and polymerizable dispersant to form polymer-enclosed color-imparting particles. In certain embodiments, at least a portion of the polymerization occurs during formation of nanoparticles, if applicable. A free radical initiator is often used. Both water and oil soluble initiators can be used.

Non-limiting examples suitable water-soluble initiators include ammonium peroxydisulfate, potassium peroxydisulfate and hydrogen peroxide. Non-limiting examples of oil soluble initiators include t-butyl hydroperoxide, dilauryl peroxide and 2,2'-azobis(isobutyronitrile). In many cases, the reaction is carried out at a temperature ranging from 20° to 80° C. The polymerization can be carried out in either a batch or a continuous process. The length of time necessary to carry out the polymerization can range from, for example, 10 minutes to 6 hours, provided that the time is sufficient to form a polymer in situ from the one or more ethylenically unsaturated monomers.

Once the polymerization process is complete, the resultant product is a stable dispersion of polymer-enclosed color-imparting particles in an aqueous medium which can contain some organic solvent. Some or all of the organic solvent can be removed via reduced pressure distillation at a temperature, for example, of less than 40° C. As used herein, the term "stable dispersion" or "stably dispersed" means that the polymer-enclosed color-imparting particles neither settle nor coagulate nor flocculate from the aqueous medium upon standing.

In certain embodiments, the polymer-enclosed particles are present in the aqueous dispersions in an amount of at least 10 weight percent, or in an amount of 10 to 80 weight percent, or in an amount of 25 to 50 weight percent, or in an amount of 25 to 40 weight percent, with weight percents being based on weight of total solids present in the dispersion.

In certain embodiments, the dispersed polymer-enclosed color-imparting particles have a maximum haze of 10%, or, in some cases, a maximum haze of 5%, or, in yet other cases, a maximum haze of 1%, or, in other embodiments, a maximum haze of 0.5%. As used herein, "haze" is determined by ASTM D1003.

The haze values for the polymer-enclosed color-imparting particles described herein are determined by first having the particles, such as nanoparticles, dispersed in a liquid (such as water) and then measuring these dispersions diluted in a solvent, for example, water, using a Byk-Gardner TCS (The Color Sphere) instrument having a 500 micron cell path length. Because the % haze of a liquid sample is concentration dependent, the % haze as used herein is reported at a transmittance of 15% to 20% at the wavelength of maximum absorbance. An acceptable haze may be achieved for relatively large particles when the difference in refractive index between the particles and the surrounding medium is low. Conversely, for smaller particles, greater refractive index differences between the particle and the surrounding medium may provide an acceptable haze.

In certain embodiments of the present invention, the aqueous dispersion of polymer-enclosed color-imparting particles described above is converted to an organic dispersion of such particles, as previously described, which is then combined with an at least partially hydrolyzed alkoxide of the formula $R_xM(OR')_{z-x}$, wherein R is an organic radical, M is selected from the group consisting of silicon, aluminum, titanium, zirconium and mixtures thereof, each R' is independently an alkyl radical, z is the valence of M and x is less than z and may be zero. The inventors have surprisingly discovered that the above-described combination is compatible, i.e., the combination remains a stable homogeneous solution for at least several days and, in some cases, several weeks, without significant solidification, settling, coagulation, or flocculation.

In certain embodiments, the polymer-enclosed color-imparting particles are present in the coating composition in an amount of 1 to 25 weight percent, such as 5 to 15 weight percent, with weight percent being based on the total solid weight of the composition. In certain embodiments, the alkoxide is present in the coating composition in an amount of 50 to 99 weight percent based on total solid weight.

In addition to the organic dispersion of polymer-enclosed color-imparting particles and the at least partially hydrolyzed alkoxide, the coating compositions of the present invention may also include other materials. For example, the coating compositions of the present invention can also include one or more standard additives, such as flow additives, rheology modifiers, adhesion promoters, and the like. In certain embodiments, the coating compositions of the present invention comprise a UV absorber.

In certain embodiments, the coating compositions of the present invention comprise an organosiloxane polyol, as described in U.S. patent application Ser. No. 11/116,552 at [0004] to [0007], the cited portion of which being incorporated herein by reference. Such a material, if used, is often present in the coating composition in an amount of 1 to 25 weight percent, such as 2 to 15 or 5 to 10 weight percent, based on the total solid weight of the coating composition.

In certain embodiments, the coating compositions of the present invention comprise a silica sol comprising silica nanoparticles and a polymerizable (meth)acrylate binding agent. As used herein, the term "silica sol" refers to a colloidal dispersion of finely divided silica particles dispersed in a binding agent, which, in the present invention comprises an polymerizable (meth)acrylate. As used herein, the term "silica" refers to $SiO_2$. In certain embodiments, the nanoparticles present in the silica sol have an average primary particle size of 300 nanometers or less, such as 200 nanometers or less, or, in some cases, 100 nanometers or less, or, in yet other cases, 50 nanometers or less, or, in some cases, 20 nanometers or less.

As indicated, the silica sol comprises a polymerizable (meth)acrylate binding agent. As used herein, the term "(meth)acrylate" is meant to include both acrylate and methacrylate. Polymerizable (meth)acrylates suitable for use as a binding agent in the silica sols present in certain embodiments of the coating compositions of the present invention include unsaturated (meth)acrylate monomers and oligomers, such as, for example, mono-, di-, tri-, tetra-, and penta-(meth)acrylates. Non-limiting specific examples of such materials include hydroxyethylmethacrylate, trimethylolpropaneformalacrylate, hexanedioldiacrylate, tripropyleneglycoldiacrylate, neopentylglycoldiacrylate, trimethylolpropanetriacrylate, glycerintriacrylate, and/or pentaerythritoltetraacrylate, among others.

Silica sols suitable for use in the present invention are commercially available. Examples include the Nanocryl® line of products available from Hanse Chemie AG, Geesthacht, Germany. These products are low viscosity sols having a silica content of up to 50 percent by weight.

In certain embodiments, the silica sol further comprises an organic solvent. Suitable organic solvents are those that will stabilize the silica sol in the coating composition. The minimum amount of solvent present in the coating composition is a solvating amount, i.e., an amount which is sufficient to solubilize or disperse the silica sol in the coating composition. For example, the amount of solvent present may range from 20 to 90 weight percent based on the total weight of the coating composition. Suitable solvents include, but are not limited to, the following: benzene, toluene, methyl ethyl ketone, methyl isobutyl ketone, acetone, ethanol, tetrahydrofurfuryl alcohol, propyl alcohol, propylene carbonate, N-methylpyrrolidinone, N-vinylpyrrolidinone, N-acetylpyrrolidinone, N-hydroxymethylpyrrolidinone, N-butylpyrrolidinone, N-ethylpyrrolidinone, N-(N-octyl)-pyrrolidinone, N-(n-dodecyl)pyrrolidinone, 2-methoxyethyl ether, xylene, cyclohexane, 3-methylcyclohexanone, ethyl acetate, butyl acetate, tetrahydrofuran, methanol, amyl propionate, methyl propionate, diethylene glycol monobutyl ether, dimethyl sulfoxide, dimethyl formamide, ethylene glycol, mono- and dialkyl ethers of ethylene glycol and their derivatives, which are sold as CELLOSOLVE industrial solvents by Union Carbide, propylene glycol methyl ether and propylene glycol methyl ether acetate, which are sold as DOWANOL® PM and PMA solvents, respectively, by Dow Chemical and mixtures of such recited solvents.

As a result, in certain embodiments, such as where the silica sol is one of the commercially available Nanocryl® silica sols described above, the silica sol is first diluted with an organic solvent prior to combining the silica sol with an at least partially hydrolyzed alkoxide of the type described herein.

In certain embodiments, the silica sol is present in the coating composition in an amount of 1 to 25 percent by weight, such as 2 to 15 percent by weight, with the weight percents being based on the total weight of the composition.

In certain embodiments, the coating compositions of the present invention are, aside from the materials introduced to the coating composition as part of the silica sol, substantially free of, or, in some cases, completely free of any free radically polymerizable material. Examples of such materials are mono-, di-, tri-, tetra- or pentafunctional monomeric or oligomeric aliphatic, cycloaliphatic or aromatic (meth)acrylates. As used herein, the term "substantially free" means that the material being discussed is present in the composition, if at all, as an incidental impurity. In other words, the material does not affect the properties of the composition. As used herein, the term "completely free" means that the material is not present in the composition at all.

In certain embodiments, the coating compositions of the present invention are substantially free of, or, in some cases, completely free of any free radical polymerization initiators. Such materials include any compound that forms free radicals upon exposure to actinic radiation. Specific examples of such materials, which, in certain embodiments, are substantially or completely absent from the coating compositions of the present invention, are benzoins, benzil, benzil ketals, anthraquinones, thioxanthones, xanthones, acridine derivatives, phenazene derivatives, quinoxaline derivatives, 1-phenyl-1,2-propanedione-2-O-benzoyloxime, 1-aminophenyl ketones, 1-hydroxyphenyl ketones, and triazine compounds. Other free radical polymerization initiators, which, in certain embodiments, are substantially or completely absent from the coating compositions of the present invention are acetophenones, benzil ketals and benzoylphosphine oxides. Another class of free radical polymerization initiators, which, in certain embodiments, are substantially or completely absent from the coating compositions of the present invention are the ionic dye-counter ion compounds, which are capable of absorbing actinic rays and producing free radicals, such as the materials described in published European-patent application EP 223587 and U.S. Pat. Nos. 4,751,102; 4,772,530 and 4,772,541.

The coating compositions of the present invention can be applied to any suitable substrate, however, in many cases, the substrate is a plastic substrate, such as thermoplastic substrate, including, but not limited to, polycarbonate, acrylonitrile butadiene styrene, blends of polyphenylene ether and polystyrene, polyetherimide, polyester, polysulfone, acrylic, and copolymers and/or blends thereof.

Prior to applying the coating composition to such a substrate, the substrate surface may be treated by cleaning. Effective treatment techniques for plastics include ultrasonic cleaning; washing with an aqueous mixture of organic solvent, e.g., a 50:50 mixture of isopropanol:water or ethanol:water; UV treatment; activated gas treatment, e.g., treatment with low temperature plasma or corona discharge, and chemical treatment such as hydroxylation, i.e., etching of the surface with an aqueous solution of alkali, e.g., sodium hydroxide or potassium hydroxide, that may also contain a fluorosurfactant. See U.S. Pat. No. 3,971,872, column 3, lines 13 to 25; U.S. Pat. No. 4,904,525, column 6, lines 10 to 48; and U.S. Pat. No. 5,104,692, column 13, lines 10 to 59, which describe surface treatments of polymeric organic materials.

The coating compositions of the present invention may be applied to the substrate using, for example, any conventional coating technique including flow coating, dip coating, spin coating, roll coating, curtain coating and spray coating. Application of the coating composition to the substrate may, if desired, be done in an environment that is substantially free of dust or contaminants, e.g., a clean room. Coatings prepared by the process of the present invention may range in thickness from 0.1 to 50 microns (μm), such as from 2 to 20 μm, and, in some cases, from 2 to 10 μm, e.g., 5 μm.

Following application of a coating composition of the present invention to the substrate, the coating is cured, such as by flashing the coating at ambient temperature for up to one hour, and then baking the coating at an appropriate temperature and time, which can be determined by one skilled in the art based upon the particular coating and/or substrate being used. As used herein, the terms "cured" and "curing" refer to the at least partial crosslinking of the components of the coating that are intended to be cured, i.e., cross-linked. In certain embodiments, the crosslink density, i.e., the degree of crosslinking, ranges from 35 to 100 percent of complete crosslinking. The presence and degree of crosslinking, i.e., the crosslink density, can be determined by a variety of methods, such as dynamic mechanical thermal analysis (DMTA) using a Polymer Laboratories MK III DMTA analyzer, as is described in U.S. Pat. No. 6,803,408, at col. 7, line 66 to col. 8, line 18, the cited portion of which being incorporated herein by reference.

In certain embodiments, when a material that generates an acid on exposure to actinic radiation is present in a coating composition of the present invention, as described above, the coating composition may be at least partially cured by irradiating the coated substrate with a curing amount of ultraviolet light, either after thermally curing the coating, simultaneously during a thermal curing process, or in lieu of a thermal curing process. During the irradiation step, the coated substrate may be maintained at room temperature, e.g., 22° C., or it may be heated to an elevated temperature which is below the temperature at which damage to the substrate occurs.

One feature of certain embodiments of the coating compositions of the present invention is that when a silica sol comprising a polymerizable (meth)acrylate binding agent is used, the polymerizable (meth)acrylate present in the silica sol remains substantially uncrosslinked after the coating composition has been cured, i.e., after the previously described curing step which cures the hardcoat resin matrix. As used herein, the term "substantially uncrosslinked" means that upon cure of the coating composition to form a hard coat, the polymerizable (meth)acrylate has not reacted with itself or other composition components to an extent that the adhesion of the resultant hard coat on a polycarbonate substrate is negatively impacted, i.e., the hard coat exhibits a reduced adhesion rating, when measured as described in the Examples herein.

The present invention is also directed to methods for preparing a coating composition. These methods comprise: (a) preparing an organic dispersion of polymer-enclosed color-imparting particles; (b) preparing an at least partially hydrolyzed alkoxide of the formula $R_xM(OR')_{z-x}$, wherein R is an organic radical, M is selected from the group consisting of silicon, aluminum, titanium, zirconium and mixtures thereof, each R' is independently an alkyl radical, z is the valence of M and x is less than z and may be zero; and (c) combining the organic dispersion of color-imparting particles with the at least partially hydrolyzed alkoxide.

The present invention is also directed to an article at least partially coated with a tinted hard coat deposited from a coating composition comprising: (a) an alkoxide of the general formula $R_xM(OR')_{z-x}$ where R is an organic radical, M is silicon, aluminum, titanium, and/or zirconium, each R' is independently an alkyl radical, z is the valence of M, and x is a number less than z and may be zero; and (b) polymer-enclosed color-imparting particles.

As used herein, the term "tinted hard coat" refers to a hard coat that absorbs some wavelengths of visible light (400 to 700 nanometers) more than it absorbs other wavelengths in the visible region. In certain embodiments, the hard coat is also transparent, i.e., it has a spectral transmission of at least 60%, in some cases at least 80%, at a wavelength ranging from 410 nanometers to 700 nanometers, based upon ASTM Standard No. D-1003 using a Hunter Lab COLORQUEST® II Sphere spectrophotometer that is available from Hunter Associates Laboratory, Inc. of Reston, Va. The transparency values reported herein are obtained using visible light with a wavelength ranging from about 410 nanometers to about 700 nanometers. All percentage transmittance and all percentage haze determinations are based on samples having a dry film thickness as specified in the Examples. As used herein, the term "hard coat" refers to a coating that offers one or more of chip resistance, impact resistance, abrasion resistance, UV degradation resistance, humidity resistance, and/or chemical resistance.

The present invention is also directed to a method for tinting a coating composition comprising an at least partially hydrolyzed alkoxide of the formula $R_xM(OR')_{z-x}$, wherein R is an organic radical, M is selected from the group consisting of silicon, aluminum, titanium, zirconium and mixtures thereof, each R' is independently an alkyl radical, z is the valence of M and x is less than z and may be zero, the method comprises including in the composition an organic dispersion of polymer-enclosed color-imparting particles.

Illustrating the invention are the following examples that are not to be considered as limiting the invention to their details. All parts and percentages in the examples, as well as throughout the specification, are by weight unless otherwise indicated.

EXAMPLES

Example 1

Polyurethane Dispersion

This example describes the preparation of a polyurethane dispersion that was subsequently used to the form the respective polyurethane/nanopigment dispersions of Examples 2 to 4. The polyurethane dispersion was prepared from the following mixture of ingredients in the ratios indicated:

| Ingredients | Weight (grams) |
|---|---|
| Charge I | |
| Poly (butylene oxide)[1] | 355.6 |
| Dimethylolpropionic acid (DMPA) | 119.2 |
| Tri-ethylamine | 54.0 |
| Butylated hydroxytoluene | 2.2 |
| Triphenyl phosphate | 1.1 |
| Charge II | |
| Hydroxyethyl methacrylate (HEMA) | 27.8 |
| Butyl methacrylate | 48.4 |
| Butyl acrylate | 319.2 |
| Charge III | |
| Methylene bis(4-cyclohexylisocyanate) | 558.9 |
| Charge IV | |
| Butyl methacrylate | 55.6 |

-continued

| Ingredients | Weight (grams) |
|---|---|
| Charge V | |
| Deionized water | 2086.3 |
| Diethanolamine | 20.2 |
| Ethylenediamine | 26.9 |
| Dimethylethanolamine | 19.7 |
| Charge VI | |
| Butyl methacrylate | 50.0 |

[1] Poly (butylene oxide) having a number average molecular weight of 1000.

The polyurethane dispersion was prepared in a four neck round bottom flask equipped with an electronic temperature probe, mechanical stirrer, condenser, and a heating mantle. Charge I was stirred 5 minutes in the flask at a temperature of 125° C. Charge II was added and the mixture was cooled to 70° C. Charge III was added over a 10 minute period. Charge IV was added and the resulting mixture was gradually heated to 90° C. over 90 minutes and then held at 90° C. for 1 hour. Charge V was stirred in a separate flask and heated to 60° C. 1387.8 g of the reaction product of Charges I, II, III, and IV was added to Charge V over 10 minutes. Charge VI was added and the resulting mixture was cooled to room temperature. The final product was a translucent emulsion with an acid value of 12.5, a Brookfield viscosity of 3710 centipoise (spindle #5 at 60 rpm), a pH of 7.6, and a nonvolatile content of 29.4% as measured at 110° C. for one hour.

Example 2

Polyurethane/Nanopigment Dispersion

This example describes the preparation of a nano-sized PB 15:3 phthalocyanine blue pigment dispersion. The dispersion was prepared from the following mixture of ingredients in the ratios indicated:

| Ingredients | Weight (grams) |
|---|---|
| Charge I | |
| Polyurethane dispersion of Example 1 | 7271.0 |
| Deionized water | 3293.1 |
| Hydroquinone methyl ether (MEHQ) | 2.0 |
| PB 15:3 pigment | 1079.5 |
| Shellsol OMS (Shell Chemical Co.) | 131.5 |
| Charge II | |
| Deionized water | 102.4 |
| t-Butyl hydroperoxide (70% aqueous solution) | 12.3 |
| Charge III | |
| Deionized water | 512.1 |
| Ferrous ammonium sulfate | 0.15 |
| Sodium metabisulfite | 12.3 |

The ingredients were mixed using a Ross rotor/stator mixer Model #HSM-100L for 2.5 hours and then recycled through an Advantis V15 Drais mill containing 500 ml of 0.3 mm Zirconox YTZ® grinding media in a one liter grinding chamber. The mixture was milled at 1400 rpm for a total time of 19.0 hours. The progress of the milling was monitored by visually observing changes in the transparency of thin films of samples drawn down over black and white Leneta paper. Charge II was added and the resulting mixture was stirred 5 minutes at 11° C. Charge III was added in two aliquots over 5 minutes. The temperature of the mixture increased to 13° C. The final product was a blue liquid with a Brookfield viscosity of 26 centipoise (spindle #1 at 60 rpm), a pH of 7.2, and a nonvolatile content of 30.0% as measured at 110° C. for one hour.

Example 3

Polyurethane/Nanopigment Dispersion

This example describes the preparation of a nano-sized PR 122 quinacridone magenta pigment dispersion. The dispersion was prepared from the following mixture of ingredients in the ratios indicated:

| Ingredients | Weight (grams) |
|---|---|
| Charge I | |
| Polyurethane dispersion of Example 1 | 7271.0 |
| Deionized water | 3293.1 |
| Hydroquinone methyl ether (MEHQ) | 2.0 |
| PR 122 pigment | 1079.5 |
| Shellsol OMS (Shell Chemical Co.) | 131.5 |
| Charge II | |
| Deionized water | 102.4 |
| t-Butyl hydroperoxide (70% aqueous solution) | 12.3 |
| Charge III | |
| Deionized water | 512.1 |
| Ferrous ammonium sulfate | 0.15 |
| Sodium metabisulfite | 12.3 |

The ingredients were mixed using a Ross rotor/stator mixer Model #HSM-100L for 4 hours and then recycled through an Advantis V15 Drais mill containing 500 ml of 0.3 mm Zirconox YTZ® grinding media in a one liter grinding chamber. The mixture was milled at 1400 rpm for a total time of 23 hours. The progress of the milling was monitored by visually observing changes in the transparency of thin films of samples drawn down over black and white Leneta paper. Charge II was added and the resulting mixture was stirred 5 minutes at 24° C. Charge III was added in two aliquots over 5 minutes. The temperature of the mixture increased to 26° C. The final product was a magenta liquid with a Brookfield viscosity of 27 centipoise (spindle #1 at 60 rpm), a pH of 7.4, and a nonvolatile content of 29.3% as measured at 110° C. for one hour.

Example 4

Polyurethane/Nanopigment Dispersion

This example describes the preparation of a nano-sized PY 128 di-azo yellow pigment dispersion. The dispersion was prepared from the following mixture of ingredients in the ratios indicated:

| Ingredients | Weight (grams) |
|---|---|
| Charge I | |
| Polyurethane dispersion of Example 1 | 7271.0 |
| Deionized water | 3293.1 |
| Hydroquinone methyl ether (MEHQ) | 2.0 |

-continued

| Ingredients | Weight (grams) |
|---|---|
| PY 128 pigment | 1079.5 |
| Shellsol OMS (Shell Chemical Co.) | 131.5 |
| Charge II | |
| Deionized water | 102.4 |
| t-Butyl hydroperoxide (70% aqueous solution) | 12.3 |
| Charge III | |
| Deionized water | 512.1 |
| Ferrous ammonium sulfate | 0.15 |
| Sodium metabisulfite | 12.3 |

The ingredients were mixed using a Ross rotor/stator mixer Model #HSM-100L for 5.5 hours and then recycled through an Advantis V15 Drais mill containing 500 ml of 0.3 mm Zirconox YTZ® grinding media in a one liter grinding chamber. The mixture was milled at 1400 rpm for a total time of 23 hours. The progress of the milling was monitored by visually observing changes in the transparency of thin films of samples drawn down over black and white Leneta paper. Charge II was added and the resulting mixture was stirred 5 minutes. Charge III was added in two aliquots over 5 minutes. The final product was a yellow liquid with a Brookfield viscosity of 53 centipoise (spindle #1 at 60 rpm), a pH of 7.3, and a nonvolatile content of 28.8% as measured at 110° C. for one hour.

Example 5

Preparation of Pre-Hydrolyzed Hardcoat Solution

Diluted nitric acid solution was prepared by mixing 1.05 grams of 70% nitric acid with 7000.00 grams of DI water.

In a clean reaction vessel, 326.4 grams of glycidoxypropyltrimethoxysilane and 186.0 grams of tetramethyl orthosilicate were mixed. The contents were cooled with an ice/water bath. When the temperature of the silane mixture in the reaction vessel reached between 10-15° C., 80.5 grams of pre-diluted nitric acid solution was rapidly added with stirring to the reaction vessel. Increased temperature was observed as the result of the exothermal reaction. The ice/water bath kept the maximum reaction temperature between 15-20° C. The maximum temperature was reached 5-10 minutes after the addition of the acid solution. After the maximum temperature was reached, additional 80.5 grams of pre-diluted nitric acid solution was added into the reaction vessel under stirring. The maximum temperature was reached 5-10 minutes after the second charge of the acid solution. The ice/water bath should kept the maximum reaction temperature between 20-25° C. After the maximum temperature was reached, the water bath was removed and the reaction vessel was stirred at room temperature for 3 hours. After this time, the pH of the mixture was between 1.9-2.0. The pH was then adjusted to 5.5 by slowly adding a few drops of 25% tetramethylammonium hydroxide solution in methanol into the reaction vessel. After pH adjustment, 264.5 grams of Dowanol PM, 12.1 grams of 50% triarylsulfonium hexafluorophosphate salts solution in propylene carbonate, and 1.2 grams of BYK-306 were added into the reaction vessel, and the reaction mixture was stirred for 10-20 minutes at room temperature.

In a separate container, 42.40 grams of Nanocryl 140, 42.40 grams of Dowanol PM and 590.00 grams of diacetone alcohol were mixed. This mixture was then added into the reaction vessel, and the reaction mixture was stirred for additional 30 minutes at room temperature. The coating solution was then filtered through a 0.45 micron nominal capsule filter in a single pass.

Example 6

Preparation of Tinted Hardcoat Compositions

The compositions were prepared by diluting 2.0 grams of the polyurethane/nanopigment dispersions prepared according to Examples 2 to 4 with 20.0 grams of Dowanol PM/diaceton alcohol solvent mixture (3:1 by weight). This solution was then added into pre-hydrolyzed silane clear hardcoat solution prepared according to Example 5 under stirring. The mixtures were stirred for additional 10-20 minutes at room temperature.

Example 7

Mokrolon® transparent polycarbonate substrate (Bayer AG) was rinsed and wiped with 2-propanol. Tinted hardcoat compositions of Example 6 were spin applied on un-primed substrate and cured with D bulb with UVA dosage of 6-8 J/cm$^2$ under air. The final dry film thickness was 3-5 μm. Coated samples were evaluated for optical appearance, color, adhesion and taber abrasion resistance.

As demonstrated in the following table, polycarbonate samples coated with nanotinted hardcoat compositions were colored and transparent. The coatings also provided good adhesion and abrasion resistance.

| | Sample | | | |
|---|---|---|---|---|
| Component (g)[1] | 1 | 2 | 3 | 4 |
| Pre-hydrolyzed silane clear hardcoat solution | 20 | 20 | 20 | 20 |
| Dispersion of Example 3 | 0 | 2 | 0 | 0 |
| Dispersion of Example 4 | 0 | 0 | 2 | 0 |
| Dispersion of Example 2 | 0 | 0 | 0 | 2 |
| Testing | Results | | | |
| Color[2] | clear | magenta | yellow | cyan |
| L[3] | 94.97 | 94.05 | 95.15 | 94.15 |
| a* | −0.25 | 1.38 | −1.25 | −1.43 |
| b* | 0.52 | −0.88 | 2.66 | −0.91 |
| Initial transmission (%)[4] | 87 | 85 | 87 | 86 |
| Adhesion[5] | 5 | 5 | 5 | 5 |
| Initial Haze %[6] | 0.4 | 2.4 | 2.2 | 0.9 |
| Delta Haze % after 300 cycles of Taber Abrasion[7] | 5.4 | 6.8 | 7.7 | 7.1 |

[1]Weight in grams.
[2]The color was visually evaluated after UV cure.
[3]L, a*, b* color values were measured with Hunter Lab spectrophotometer.
[4]Initial transmission was measured with Hunter Lab spectrophotometer.
[5]Adhesion: Crosshatch, Nichibon LP-24 adhesive tape. Rating scale 0–5 (no adhesion - 100% adhesion after tape pull).
[6]Initial haze % was measured with Hunter Lab spectrophotometer.
[7]Taber Abrasion: Taber 5150 Abrader, CS-10 wheels, 500 grams of weight. Haze % was measured after 300 taber cycles. Delta haze % <10% after 300 taber cycles is acceptable.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

We claim:

1. A coating composition comprising:
   (a) an alkoxide of the general formula $R_xM(OR')_{z-x}$ where R is an organic radical, M is selected from the group consisting of silicon, aluminum, titanium, zirconium and mixtures thereof each R' is independently an alkyl radical, z is the valence of M, and x is a number less than z and may be zero; and
   (b) polymer-enclosed color-imparting particles.

2. The coating composition of claim 1, wherein the alkoxide comprises a combination of a glycidoxy[($C_1$-$C_3$)alkyl]tri($C_1$-$C_4$)alkoxysilane monomer and a tetra($C_1$-$C_6$)alkoxysilane monomer.

3. The coating composition of claim 2, wherein the glycidoxy[($C_1$-$C_3$)alkyl]tri($C_1$-$C_4$)alkoxysilane monomer comprises y-glycidoxypropyltrimethoxysilane.

4. The coating composition of claim 2, wherein the tetra ($C_1$-$C_6$)alkoxysilane comprises tetramethoxysilane and/or tetraethoxysilane.

5. The coating composition of claim 1, wherein the alkoxide is at least partially hydrolyzed before it is combined with the polymer-enclosed color-imparting particles.

6. The coating composition of claim 1, further comprising a catalyst comprising an acidic material and/or a material which generates an acid upon exposure to actinic radiation.

7. The coating composition of claim 6, wherein the material which generates an acid upon exposure to actinic radiation comprises a cationic photoinitiator.

8. The coating composition of claim 1, wherein the polymer-enclosed color-imparting particles comprise nanoparticles.

9. The coating composition of claim 8, wherein the nanoparticles have an average primary particle size of 100 nanometers or less.

10. The coating composition of claim 1, wherein the polymer-enclosed color-imparting particles comprise an organic pigment.

11. The coating composition of claim 1, wherein the polymer-enclosed color-imparting particles are present in the form of an organic dispersion of polymer-enclosed color-imparting particles.

12. The coating composition of claim 11, wherein the organic dispersion of polymer-enclosed color-imparting particles is formed from the conversion of an aqueous dispersion of polymer-enclosed color-imparting particles.

13. The coating composition of claim 12, wherein the conversion is accomplished by diluting the aqueous dispersion of polymer-enclosed color-imparting particles with a polar protic organic solvent, wherein the organic solvent is added in an amount sufficient to produce a dispersion wherein the continuous phase comprises predominantly organic solvent.

14. The coating composition of claim 1, wherein the polymer-enclosed color-imparting particles comprise a polyether polymer.

15. The coating composition of claim 1, wherein the polymer-enclosed color-imparting particles have a maximum haze of 10%.

16. A method for preparing a coating composition comprising:
   (a) preparing an organic dispersion of polymer-enclosed color-imparting particles;
   (b) preparing an at least partially hydrolyzed alkoxide of the formula $R_xM(OR')_{z-x}$, wherein R is an organic radical, M is selected from the group consisting of silicon, aluminum, titanium, zirconium and mixtures thereof each R' is independently an alkyl radical, z is the valence of M and x is less than z and may be zero; and
   (c) combining the organic dispersion of color-imparting particles with the at least partially hydrolyzed alkoxide.

17. An article at least partially coated with a tinted hard coat deposited from a coating composition comprising:
   (a) an alkoxide of the general formula $R_xM(OR')_{z-x}$ where R is an organic radical, M is selected from the group consisting of silicon, aluminum, titanium, zirconium and mixtures thereof, each R' is independently an alkyl radical, z is the valence of M, and x is a number less than z and may be zero; and
   (b) polymer-enclosed color-imparting particles.

18. The article of claim 17, wherein the tinted hard coat is transparent.

19. A method for tinting a coating composition comprising an at least partially hydrolyzed alkoxide of the formula $R_xM(OR')_{z-x}$, wherein R is an organic radical, M is selected from the group consisting of silicon, aluminum, titanium, zirconium and mixtures thereof each R' is independently an alkyl radical, z is the valence of M and x is less than z and may be zero, the method comprises including in the composition an organic dispersion of polymer-enclosed color-imparting particles.

* * * * *